3,060,242
ARALKYL ETHER
David A. Gordon, Midland, Mich., assignor to The Dow Chemical Company, Midland, Mich., a corporation of Delaware
No Drawing. Filed Oct. 1, 1958, Ser. No. 764,520
1 Claim. (Cl. 260—611)

The present invention is directed to the novel compound bis(2-diphenylmethoxyethyl) ether, corresponding to the formula

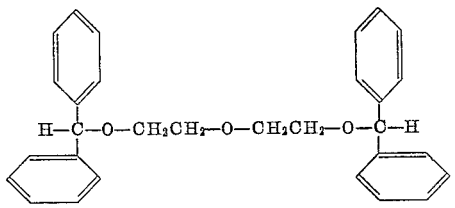

The novel compound is a colorless liquid, soluble in many common organic solvents such as methylcyclohexane, benzene, toluene, and diethyl ether, and of very low solubility in water. It is useful as a parasiticide, and is especially adapted to be employed as the active toxicant in compositions to be used for the control of insects.

The novel compound may be prepared by causing a reaction between benzhydrol and diethylene glycol, in the presence of an acidic catalyst. Conveniently, the reaction is carried out in a liquid reaction medium which may be a reaction solvent. Good results are obtained when employing approximately 2 molecular proportions of benzhydrol for each molecular proportion of diethylene glycol. An acidic catalyst which may be benzenesulfonic acid, sulfuric acid, sodium bisulfate, or preferably, p-toluene sulfonic acid, is employed in a catalytic amount such as, for example, 0.05 mole percent. The reaction takes place smoothly when the reactants are contacted at temperatures between 75° and 150° C. conveniently at the reflux temperature of the reaction mixture, with preparation of the desired product and water as byproduct. Water of reaction is advantageously removed as it is formed by means of a device such as a Dean-Stark trap, and the liquid reaction medium which is conveniently methylcyclohexane is therefrom recycled to the refluxing mixture. Upon completion of the reaction, the desired product is removed in known manners. In one such procedure, the reaction mixture is passed through an activated charcoal, solvent removed by vaporization, and the resulting residue fractionally distilled under gradually decreasing pressures and increasing temperatures to obtain the desired product.

The following example illustrates the invention but is not to be considered as limiting it.

Example

Benzhydrol (2 moles; 368.5 grams), 1 mole diethylene glycol (106.1 grams) and 1 gram p-toluene sulfonic acid were intimately mixed and blended together in 1 liter methylcyclohexane reaction solvent. The resulting reaction mixture was heated overnight, with stirring, at the reflux temperature, 95°–103° C. The reflux condensate was collected in a Dean-Stark trap whereby water was rejected and the methylcyclohexane solvent returned to the refluxing mixture. The heating and stirring at the reflux temperature were continued for 12 hours to carry the reaction to completion. Thereafter, the reaction mixture was passed through a bed of activated charcoal ("Norite") and then filtered hot. Heating, substantially below the boiling temperature, was thereafter continued as the reaction mixture was maintained in a current of moving air, whereby the methylcyclohexane solvent was vaporized and removed. The resulting viscous liquid residue was then fractionally distilled under decreasing subatmospheric pressures and at increasing temperatures to obtain the desired bis(2-diphenylmethoxyethyl) ester product as a colorless liquid fraction having a boiling point of 220° C. under 0.09 milliliter pressure, and a refractive index $n/D$ of 1.5835 at 25° C.

The present compound is useful as a fungicide and is especially useful as the active toxicant in insecticidal compositions. In a representative operation, the application to young bean plants of an aqueous dispersion containing the present compound in the concentration of 2 ounces per hundred gallons of ultimate composition resulted in a complete kill of a population of larvae of Mexican bean beetle parasitizing the said bean plants, without evidence of injury to the said plants.

I claim:
Bis(2-diphenylmethoxyethyl)ether.

References Cited in the file of this patent

Cast et al.: Jour. Chem. Soc. (1953), pages 4180–4181 (London).
Pratt et al.: Chem. Abs., vol. 50 (1956), pages 10036–10037. (Copies in Library.)

UNITED STATES PATENT OFFICE
CERTIFICATE OF CORRECTION

Patent No. 3,060,242                    October 23, 1962

David A. Gordon

It is hereby certified that error appears in the above numbered patent requiring correction and that the said Letters Patent should read as corrected below.

Column 2, line 28, for "ester" read -- ether --.

Signed and sealed this 7th day of May 1963.

(SEAL)
Attest:

ERNEST W. SWIDER
Attesting Officer

DAVID L. LADD
Commissioner of Patents